United States Patent [19]

Tanaka et al.

[11] 4,338,404

[45] Jul. 6, 1982

[54] GEL PERMEATION CHROMATOGRAPHIC PACKING AND PROCESS FOR PRODUCING SAME UTILIZING SUSPENSION POLYMERIZATION

[75] Inventors: Yasuyuki Tanaka, Hachioji; Junichi Takeda, Tokyo; Kohji Noguchi, Kawasaki, all of Japan

[73] Assignee: Asahi Kasei Kogyo Kabushiki Kaisha, Osaki, Japan

[21] Appl. No.: 228,505

[22] Filed: Jan. 26, 1981

Related U.S. Application Data

[63] Continuation of Ser. No. 74,028, Sep. 10, 1979, abandoned.

[30] Foreign Application Priority Data

Sep. 9, 1978 [JP] Japan ................................. 53-110211
Dec. 20, 1978 [JP] Japan ................................. 53-156292

[51] Int. Cl.$^3$ ............................................. C08J 9/16
[52] U.S. Cl. ..................................... 521/52; 210/635; 526/336
[58] Field of Search .......................... 521/52; 526/336

[56] References Cited

U.S. PATENT DOCUMENTS 3,322,695  5/1967  Alfrey et al. ........................ 521/138
3,326,875  6/1967  Moore ................................. 528/495
4,174,430  11/1969  Kido et al. .......................... 526/336

*Primary Examiner*—Stanford M. Levin
*Attorney, Agent, or Firm*—Sughrue, Mion, Zinn, Macpeak and Seas

[57] ABSTRACT

A novel granular crosslinked copolymer suitable as a high speed liquid chromatograph packing and especially as a gel permeation chromatograph packing is disclosed. In a preferred embodiment of the invention the packing is a copolymer of styrene and divinylbenzene having a volume average particle diameter of about 2 to 50 μm, an exclusive molecular weight for a polystyrene being from about 500 to 20,000, and the weight % (X) of divinylbenzene units based on the entire monomeric units of the copolymer and the gradient (α) of the calibration curve of the polystyrene are defined by the region bounded by and including the following three lines in rectangular coordinates (α, X)

$$\alpha = \frac{2}{15} X + \frac{4}{3}$$

$\alpha = 2.5$ $X = 35$ and a process for preparing the same by suspension polymerization in the presence of an initiator having specific half-life properties is disclosed.

15 Claims, 9 Drawing Figures

GEL PERMEATION CHROMATOGRAPHIC PACKING AND PROCESS FOR PRODUCING SAME UTILIZING SUSPENSION POLYMERIZATION

This is a continuation, of application Ser. No. 74,028, filed Sept. 10, 1979, abandoned.

BACKGROUND OF THE INVENTION

1. Field of the Invention

This invention relates to a novel granular crosslinked copolymer, a packing for high-speed liquid chromatography (abbreviated "HLC") comprising this crosslinked copolymer, and to a process for the production thereof. More specifically, this invention relates to a packing for HLC comprising a styrene-divinylbenzene based copolymer having superior ability to separate organic oligomeric substances, and to a process for production thereof.

2. Description of the Prior Art

With a recent advance in the study and commercialization of "oligomers" having a molecular weight of several hundred to several thousand, their structural characteristics have been determined by infrared absorption spectroscopy, ultraviolet absorption spectroscopy, nuclear magnetic resonance spectroscopy, mass spectrometry analysis, etc. However, no satisfactory method has been established for isolating the oligomers as a single chemical species (molecules), and studies of oligomers as a single chemical species have not been fully developed.

Conventional methods for separating oligomers include, for example, distillation, solvent extraction, crystallization, fractional precipitation, centrifugal separation, and liquid chromatography (abbreviated "LC"). The LC method is best among them in view of the relatively broad molecular weight range to which it is applicable, the reduced restriction on chemical stability, and the ability to separate single chemical species.

An especially suitable type of the LC method is gel permeation chromatography (abbreviated "GPC") because it permits separation by the differences in molecular weight. GPC is a type of liquid chromatography in which the speed of development is retarded as solute molecules permeate a solvent held in the pores of a column packing (to be referred to hereinbelow as a "gel"), and separation into the individual molecules is effected according to the size of solute molecules, i.e., the differences in molecular weight. Accordingly, the oligomer molecules are successively separated and flow out from the column in order of decreasing degrees of polymerization, i.e., in order of increasing ease of permeation of the gel. In the chromatogram thus obtained, the distance between peaks is narrower with smaller amounts of effluents.

When the logarithms of the molecular weights of individual molecules separated by GPC and the volumes of the effluent are plotted on the ordinate and the abscissa, a straight line having a negative slope results. Accordingly, with a higher degree of polymerization, it is more difficult to separate the components of an oligomer into a single chemical species.

In recent years, there has been a strong demand for higher speeds of analysis or separation, and the widespread use of HLC instruments has led to the extensive use of high-speed GPC which can perform analysis within several tens of minutes. To make the individual components of an oligomer having a high degree of polymerization separable by high speed GPC, modifications have been made in the operating conditions, and, for example, a recycle method has been suggested which involves repeatedly passing a solute through a column. However, such a method still suffers from various restrictions. For example, long periods of time are still required for the desired analysis or separation, the device required is expensive, or a high degree of experience is required for setting the operating conditions. This is because a column packed with a gel for high speed GPC, which is used in the field of oligomers, does not have sufficient efficiency (e.g., in separating ability). Heretofore, inorganic gels mainly composed of silica and organic synthetic polymeric gels composed of styrene-divinylbenzene have been used as organic solvent-type GPC gels. Among the inorganic gels, none have a calibration curve suitable for separation of oligomers. The gels comprising styrene-divinylbenzene which are obtained by the methods disclosed in U.S. Pat. Nos. 3,322,695 and 3,326,875, do not simultaneously have satisfactory strength and satisfactory separating ability.

SUMMARY OF THE INVENTION

A principal object of the present invention is to provide a GPC gel suitable for separation of oligomers.

A second object of the present invention is to provide a GPC gel capable of separating oligomers with large peak distances.

Still another object of the present invention is to provide a GPC gel having the aforementioned property without sacrificing the mechanical strength of the gel.

A further object of the present invention is to provide a process for producing a GPC gel suitable for separating oligomers by polymerizing a monovinylbenzene and a polyvinylbenzene.

A still further object of the present invention is to provide a process for preparing a GPC gel by suspension polymerization of styrene and divinylbenzene using a polymerization initiator having specific half-life properties.

As the result of extensive investigations directed to separating oligomers a gel which shows a large peak distance without a deterioration in the other properties (e.g., mechanical strength) and a process for preparing the same has been discovered.

DETAILED DESCRIPTION OF THE INVENTION

Figure 1:
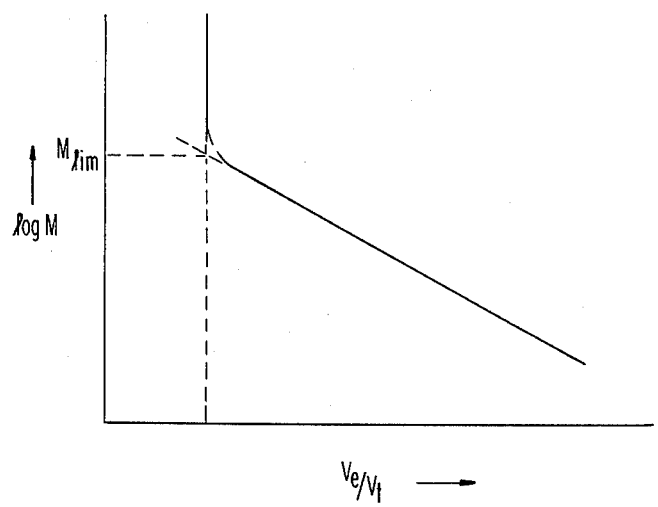
FIG. 1 is an example of a calibration curve for a GPC gel in accordance with the present invention and illustrates the definition of $M_{lim}$.

The present invention provides a novel granular crosslinked copolymer which is a monovinylbenzene-polyvinylbenzene crosslinked copolymer having a volume average particle diameter of from about 2 to 50 μm, the exclusive molecular weight (to be referred to as $M_{lim}$) for polystyrene being from about 500 to 20,000, and the weight % (X) of the polyvinylbenzene units based on the entire monomeric units of the copolymer and the gradient ($\alpha$) of the calibration curve of a polystyrene being present within a region bounded by and including the following three lines when plotted on rectangular coordinates:

$$\alpha = -\frac{2}{15} X + \frac{4}{3}$$

$\alpha = 2.5$ $X = 35$

Examples of the monovinylbenzene for the monovinylbenzene-polyvinylbenzene crosslinked copolymer of the present invention are styrene, vinyltoluene, $\alpha$-methylstyrene and ethylvinylbenzene. They may be used either alone or in combination with one another. Examples of the polyvinylbenzene are divinylbenzene and trivinylbenzene, which may be used alone or as a mixture.

Other monomers copolymerizable with the above monomers, such as acrylic acid, acrylic esters, methacrylic acid, methacrylic esters, acrylonitrile, methacrylonitrile, vinylpyridine, vinylimidazole and vinylpyrrolidone, may be added in proportions which do not substantially adversely affect the separating performance of the resulting granular crosslinked copolymer packing, in general in amounts of from 0 to about 10 wt%.

In accordance with the present invention, of the monovinylbenzene-polyvinylbenzene crosslinked copolymers a styrene-divinylbenzene based copolymer comprising styrene and divinylbenzene is preferred.

The volume average particle diameter, as used herein, denotes the particle diameter at 50% cumulative volume when plotting the particle diameters of particles on the abscissa and the cumulative volume of particles having a particle diameter on the ordinate. It can be determined in a 1% aqueous solution of sodium chloride by a Coulter Counter (a product of Coulter Electronics Company, U.S.A.).

A copolymer having a volume average particle diameter of less than 2 $\mu$m is difficult to pack into a column, and causes large pressure drops. Hence, it is unsuitable for use as a high-speed GPC gel. A copolymer having a volume average particle diameter of more than 50 $\mu$m has insufficient separating ability. For practical application, the volume average particle diameter of the copolymer is preferably from about 5 $\mu$m to 30 $\mu$m.

The weight % (X) of polyvinylbenzene units based on the entire monomeric units of the gel is defined by the following equation.

$$X = \frac{PVB}{MVB + PVB + OVM} \times 100$$

wherein MVB represents the weight of monovinylbenzene units in the gel; PVB, the weight of polyvinylbenzene units in the gel; and OVM, the weight of other vinyl monomer units in the gel.

When the gel is produced using styrene and commercial grade divinylbenzene which contains some monovinylbenzene such as ethylvinylbenzene in addition to pure divinylbenzene, the weight % (X') of divinylbenzene unit is represented by the equation:

$$X' = \frac{DVB}{St + DVB + EVB} \times 100$$

wherein St represents the weight of styrene units in the gel; DVB, the weight of pure divinylbenzene units in the gel; and EVB, the weight of vinyl monomer units in the gel other than styrene and pure divinylbenzene such as ethylvinylbenzene. In this case, X' can be determined by forming the gel into tablets together with potassium bromide, and measuring its infrared absorption spectrum using the tablets. Specifically, using a sample having a known X', the relation of the ratio between the I.R. absorption intensity of the absorption of mono-substituted benzene at 750 cm$^{-1}$ and that of the absorption of meta-disubstituted benzene at 790 cm$^{-1}$ to the proportion of divinylbenzene can be determined beforehand. Then, the divinylbenzene content X' of a sample can be determined by applying the resulting calibration curve to the infrared absorption spectrum of the sample. Sample particles having known X' can be obtained by suspension polymerization of a mixture of styrene and divinylbenzene in varying mixing ratios until the polymerization conversion reaches at least 99%. X' of this sample corresponds to the weight % of pure divinylbenzene in the total monomer before polymerization.

The GPC calibration curve is obtained by plotting the logarithm of the molecular weights of the styrene oligomers on the ordinate and the value (Ve/Vt) obtained by dividing the eluted volume (Ve) of each oligomer by the total column volume (Vt) on the abscissa, as shown in FIG. 1. It represents the relation between the eluted volume and the molecular weight of a material to be separated in the chromatogram. The inclined line and the line parallel to the ordinate in this graph are substantially straight lines, and the portion at which the two straight lines meet each other is a curve. $M_{lim}$ in this invention is expressed as the value on the ordinate at a point at which the extension of the inclined straight line crosses the extension of the line parallel to the y ordinate. $M_{lim}$ is one property which is inherent to the gel, and represents the exclusive molecular weight on which the gel can exert a separating action based on the differences in the size of molecules. Substances having a larger molecular weight than the exclusive molecular weight are eluted substantially together without being separated.

In the present invention, the gradient ($\alpha$) of the calibration curve of polystyrene is an absolute value of the gradient of the inclined straight line in FIG. 1 and is expressed by the following equation:

$$\alpha = \left| \frac{\Delta \log M}{\Delta (Ve/Vt)} \right|$$

$\alpha$ is a value inherent to the gel, and serves as a measure for the distance between peaks in the chromatogram of a substance having a certain fixed difference in molecular weight. Lower $\alpha$ means larger distances between peaks.

The calibration curve is obtained by determining the amount of an eluting solvent which is required from the time when a solution containing polystyrene of a known molecular weight is put into a sample injector near the inlet of a column which is in the equilibrated state as a result of passage of solvent, to the time when a peak of the polystyrene eluted from the column is detected by a detector located near the outlet of the column, and performing the above operation with regard to various polystyrenes having different molecular weights.

$M_{lim}$ and $\alpha$ are both values of properties inherent to the gel, but may be somewhat affected by the flow rate, the configuration of the column, the combination of the solvent and solute, etc., at the time of measurement. In order to more exactly define these values, $M_{lim}$ and $\alpha$ in this specification are defined as values obtained by the aforesaid method from a calibration curve obtained under the following conditions.

Column: Stainless steel made, inside diameter 7 to 8 mm, length 50 cm
Solvent: Chloroform
Sample: 20 μl of a 0.5% chloroform solution of polystyrene
Flow rate: 0.1 to 2.0 ml/min
Temperature: Room temperature (20°-30° C.)
Detecting method: UV 254 nm Packing of the gel into the column is performed by a rising flow in chloroform solvent.

In the gel of this invention, the $M_{lim}$ for polystyrene measured in chloroform is in the range of about 500 to 20,000, and the gel has a micropore size distribution suitable for separating molecules having a molecular weight not exceeding $M_{lim}$. A gel having an $M_{lim}$ of less than 500 permits separation of oligomers only within a low molecular weight range. On the other hand, when the $M_{lim}$ exceeds 20,000, the size of micropores becomes too large, and the gel is unsuitable for separation of oligomers. The $M_{lim}$ of the copolymer gel of this invention is preferably in the range of about 1,000 to 15,000, more preferably in the range of about 1,500 to 12,000.

$\alpha$ may be considered a measure for the size distribution of micropores in the gel in actual use for GPC. In view of the fact that with a gel having a low $\alpha$, the distance between the peaks in the chromatogram is large, and good separation is obtained, it is thought that the size distribution of micropores in the gel is relatively narrow.

It has been found that $\alpha$ and X measured in chloroform solvent with respect to polystyrene are correlated. $\alpha$ tends to become higher with higher X. In a graph having X on the abscissa and $\alpha$ on the ordinate, the relation between $\alpha$ and X in conventional gels is exclusively within the range which satisfies the following relation:

$$\alpha > \frac{2}{15} X + \frac{4}{3}$$

Accordingly, for a given X, gels having an $\alpha$ below a certain point cannot be conventionally obtained.

The copolymer gel in accordance with this invention is characterized by the fact that it has a markedly lower $\alpha$ than the conventional gels while having the same X as the conventional gels and has mechanical strength that is suitable for HLC.

$\alpha$ and X of the gel of this invention are defined by the region bounded by and including the following three lines (1), (2) and (3).

$$\alpha = \frac{2}{15} X + \frac{4}{3} \quad (1)$$

$$\alpha = 2.5 \quad (2)$$

$$X = 35 \quad (3)$$

Preferably, they are present in the region bounded by and including the following three straight lines (4), (5) and (6).

$$\alpha = \frac{2}{15} X + \frac{16}{15} \quad (4)$$

$$\alpha = 3 \quad (5)$$

$$X = 35 \quad (6)$$

Within the region bounded by and including straight lines (4), (5) and (6), gels having X and $\alpha$ within the region bounded by and including the following lines (7), (8) and (9) are especially suitable for preparative fractionation because $\alpha$ is low and the peak distance is very wide.

$$\alpha = \frac{2}{15} X + \frac{16}{15} \quad (7)$$

$$\alpha = 3 \quad (8)$$

$$X = 27 \quad (9)$$

Furthermore, gels having X and $\alpha$ within the region bounded by and including the following lines (10), (11), (12) and (13) exhibit a reduced pressure drop at flow rates usually employed for analysis and are especially suitable for high speed GPC analysis because they have a higher X and high mechanical strength.

$$\alpha = \frac{2}{15} X + \frac{16}{15} \quad (10)$$

$$\alpha = 4.4 \quad (11)$$

$$X = 27 \quad (12)$$

$$X = 35 \quad (13)$$

It should be understood, however, that these do not limit the utility of gels having structures of the respective regions.

Gels having an $\alpha$ of less than 2.5 which have heretofore been obtained have insufficient mechanical strength and are unsuitable for high speed GPC. Furthermore, when X is larger than 35% by weight, gels having a low $\alpha$ within an $M_{lim}$ range of 500 to 20,000 are difficult to obtain.

Preferably, the copolymer gel of this invention has a toluene regain (to be referred to as Sr) of 0.5 to 3.0 ml/g, especially 0.5 to 2.5 ml/g. Sr is defined as the amount (ml) of toluene which one gram of dried gel can contain, and is a measure for the amount of pores in the gel when it is wet. Gels having an Sr of less than 0.5 ml/g do not have sufficient separating ability, and gels having an Sr of more than 3.0 ml/g have insufficient mechanical strength and are unsuitable for high speed GPC. Sr is determined as follows:

A gel dipped in toluene in a fully equilibrated state is centrifuged to remove toluene adhering to the surface of the gel, and its weight ($W_1$) is measured. The gel is dried and its dry weight ($W_2$) is measured. Sr is calculated in accordance with the following equation:

$$Sr = \frac{W_1 - W_2}{dW_2}$$

In the above equation, d represents the specific gravity of toluene.

There are two typical processes for the production of gels composed of styrene-divinylbenzene suitable for the separation of oligomers.

(1) A method which comprises suspension-polymerizing a mixture consisting of styrene, divinylbenzene and a polymerization initiator with the proportion of divinylbenzene being extremely low (for example, less than 5% by weight) to form particles.

(2) A method which comprises suspension-polymerizing styrene and divinylbenzene in the presence of a swelling solvent for the gel while adjusting the amount of divinylbenzene to a value larger than in method (1), and then removing the solvent from the resulting particles (U.S. Pat. Nos. 3,326,875 and 3,322,695).

Gels obtained by method (1) have a low weight percentage (X') of divinylbenzene unit in the total monomeric units constituting the gel and are therefore unsuitable for high speed GPC which requires high mechanical gel strength. According to method (2), a porous gel having an expanded structure is obtained. Many of the high speed GPC gels used for the separation of oligomers in recent years are made by method (2). However, the gels prepared by this method have a higher degree of crosslinking than the gels prepared by method (1). Thus, they have insufficient separating ability although having superior mechanical strength.

Generally, the polymerization temperature in suspension polymerization is set such that the half-life period of the radical polymerization initiator used is about 10 hours. In the synthesis of gels, suspension polymerization is initiated at not more than 75° C. using benzoyl peroxide as a polymerization initiator as disclosed in U.S. Pat. Nos. 3,326,875 and 3,322,695. The half-life period of benzoyl peroxide in toluene at 75° C. is 10 hours (C. E. H. Bawn et al., *Trans. Faraday Soc.*, 47, 1216 (1951)).

The present inventors have succeeded in producing a high speed GPC gel having superior separating ability as described in great detail above without a substantial decrease in mechanical strength by performing the polymerization of the method (2) in such a manner that a polymerization initiator which decomposes at a comparatively low temperature is used, and at least in the early stages of polymerization, the polymerization is carried out under conditions which cause a much higher rate of decomposition of the polymerization initiator than under ordinary conditions, i.e., at higher temperatures.

Thus, according to another aspect of this invention, there is provided a process for producing a chromatographic packing, which comprises suspending in water a mixture consisting of about 65 to 90 parts by weight of at least one monovinylbenzene, about 35 to 10 parts by weight of at least one polyvinylbenzene, the total amount of the monovinylbenzene and polyvinylbenzene being 100 parts by weight, and about 30 to 200 parts by weight of a solvent capable of dissolving polystyrene, and radical-polymerizing the monomers in suspension. The polymerization is carried out in the presence of at least one initiator having a half-life period of about 2 to 60 minutes at 70° C., and in such a manner that at least until the polymerization conversion reaches 50%, the polymerization is effected at a temperature at which the half-life period of the polymerization initiator is in the range of from about 5 to 120 minutes.

The monovinylbenzene is used in an amount of about 65 to 90 parts by weight, preferably about 65 to 80 parts by weight, and the polyvinylbenzene is used in an amount of about 35 to 10 parts, preferably about 35 to 20 parts by weight. Divinylbenzene generally available as a commercial grade contains about 40% by weight or more of ethylvinylbenzene. When this commercial grade divinylbenzene is used, the divinylbenzene content is calculated as the polyvinylbenzene content and the remaining monomeric components, predominantly ethylvinylbenzene, are calculated with the monovinylbenzene content.

When the amount of the monovinylbenzene is larger than the upper limit of the aforesaid range, the mechanical strength of the gel decreases, and the gel is unsuitable for application to high speed GPC. If, on the other hand, the proportion of the monovinylbenzene is less than the lower limit of the above-specified range, the separating performance of the gel becomes poor.

Other monomers copolymerizable with the above monomers may further be added in proportions which do not substantially adversely affect the separating performance of the gel.

The solvent capable of dissolving polystyrene is a solvent which dissolves at least 1% by weight of linear polystyrene having a weight average molecular weight of $10^4$ to $10^6$ at room temperature. Such a solvent is selected from aromatic hydrocarbons, ketones, esters, nitriles and halogenated hydrocarbons. Specific examples of suitable solvents are benzene, toluene, xylene, cyclohexanone, methyl benzoate, benzonitrile, and n-butyl acetate. Toluene is preferred because of its ease of handling and low cost. These solvents may be used singly or in combination with one another.

A suitable amount of the solvent is about 30 to 200 parts by weight per 100 parts by weight of the monovinylbenzene and the polyvinylbenzene combined. If the amount of the solvent is less than the lower limit of this range, the number of micropores having a size suitable for separation of oligomers is decreased, and the separating performance of the gel is reduced. If it is larger than the upper limit of the above-specified range, the mechanical strength of the gel is reduced, and the gel becomes unsuitable for high speed GPC. In practice, the preferred amount of the solvent is within the range of about 80 to 150 parts by weight.

At least one polymerization initiator should have a half-life period of 2 to 60 minutes at 70° C. Specific examples of the initiator are 2,2'-azobis(4-methoxy-2,4-dimethylvaleronitrile), 2,2'-azobis(2,4-dimethylvaleronitrile), isobutyryl peroxide, diisopropyl peroxydicarbonate, and di-2-ethylhexyl peroxydicarbonate. Of these, 2,2'-azobis(2,4-dimethylvaleronitrile) and diisopropyl peroxydicarbonate are preferred, and these can be used individually or in combination thereof. The advantage in accordance with this invention cannot be obtained by using an initiator having a half-life period at 70° C. outside the above-specified range. But if it is used together with the initiator having the half-life period within the above range, the advantage of this invention can substantially be achieved. A free radical polymerization initiator which is conventionally used in suspension polymerization may be used with the above initiator as a mixture. In that case the amount of the initiator having a half-life period at 70° C. of 2 to 60 minutes should preferably make up at least about 60% by weight of the entire initiators. The total amount of the polymerization initiator is 0.1 to 5.0 parts by weight per 100 parts by weight of the total monomers.

A suspension stabilizer selected from generally known organic polymeric stabilizers such as polyvinyl alcohol or methyl cellulose may be used in this invention.

The volume or weight ratio between the organic layer and the aqueous layer during polymerization is not particularly critical, and may be those which are generally selected in performing suspension polymerization.

The polymerization is carried out in the following manner. Predetermined amounts of the monovinylbenzene, polyvinylbenzene, polymerization initiator and solvent capable of dissolving polystyrene are weighed, and mixed uniformly. The mixture is added to water having a suspension stabilizer dissolved therein. The mixture is stirred by a stirrer having a large shearing force such as a so-called disperser or homogenizer. Stirring increases the temperature of the mixture and polymerization may begin before oil droplets containing the monomers attain the desired particle size (about 2–50 μm). To avoid this, the vessel may be cooled externally, as required. The temperature suitable for the adjustment of the particle size of the oil droplets differs according to the amount or type of the polymerization initiator or inhibitor contained in the oil droplets, but preferably is maintained at not more than 20° C. After the oil droplets have attained the desired size, the suspension is heated with stirring to set its temperature at a predetermined value at which the polymerization reaction is performed and the half-life period of the polymerization initiator used is in the range of from about 5 to 120 minutes. Stirring may be performed to such an extent that the composition and temperature of the system are maintained uniform.

Until the polymerization conversion reaches 50%, the polymerization is carried out at a temperature at which the half-life period of the initiator in toluene is 5 to 120 minutes. When 2,2'-azobis(2,4-dimethylvaleronitrile) is used as the initiator, the polymerization is preferably carried out at 65° to 85° C. at which the half-life period of the initiator is 8 to 90 minutes. When diisopropyl peroxydicarbonate is used as the initiator, it is preferred to perform the polymerization at 60° to 80° C. at which the half-life period of the initiator is in the range of 9 to 100 minutes. If the polymerization temperature is lower than the lower limit of this specified range until the polymerization conversion reaches 50%, the separating performance of the resulting gel is reduced. When it is higher than the upper limit of the specified range, the gel obtained has low mechanical strength. Hence, polymerization temperatures outside this range are not desirable at the initial stage of polymerization specified. The polymerization temperature is not particularly restricted after the polymerization conversion has exceeded 50%. Thus, the polymerization may be carried out at the same temperature as that used in the initial stage, or at a temperature employed usually for polymerization. The polymerization is continued until no substantial progress in polymerization is noted.

After the polymerization, the resulting particles are separated by filtration, and sufficiently washed with water, hot water, acetone, etc., to remove the suspension stabilizer, solvent, remaining monomers, etc., adhering to the particles. If required, the particles are classified to make them usable as a gel for high speed GPC.

The relation between the half-life period of a polymerization initiator and the temperature can be determined from the data given in POLYMER HANDBOOK, 2nd Edition, page II-1 to II-40, edited by J. Brandrup and E. H. Immergut, published by Wiley-Interscience Publication. In particular, data obtained in toluene which is similar in chemical structure to the vinyl aromatic monomer should be used.

The type and amount of the initiator used in polymerization can be determined by analyzing the gel by thermal decomposition gas chromatography or infrared absorption spectroscopy.

In the present invention, the "polymerization conversion" is expressed by a value obtained by subtracting from 100 the percentage of residual monomers present at a certain time after the initiation of polymerization based on the total amount of monomers before polymerization. The amount of residual monomers can be determined by extracting the polymerization mixture composed of a granular crosslinked copolymer, the suspension, etc., with an organic solvent different from the components of the polymerization mixture, and analyzing the monomer components in the extract by gas chromatography.

Figure 3:
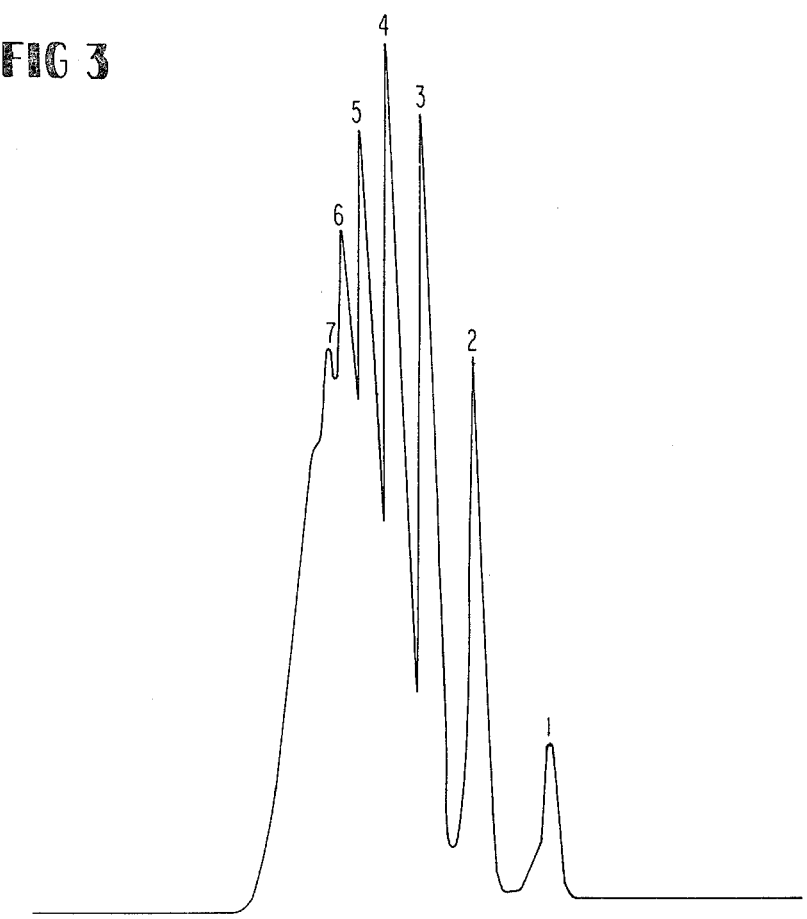
FIGS. 3 to 7 are chromatograms obtained using the gels in Examples 1, 3, 4, 5 and 6, respectively.

When an example of a chromatogram obtained by using the gel obtained by the present invention for separating styrene oligomers by GPC (Example 1, FIG. 3) is compared with a corresponding example of a conventional gel (Comparative Example 1, FIG. 8), it is seen that in the latter, only mono- to pentamers are separated, whereas in the former, mono- to heptamers can be separated, showing superior separating performance of the gel. The number of oligomers separated is larger in FIG. 3 than in FIG. 8. A more detailed study of FIG. 3 shows that the peak distance between the components is large. The large peak distance shows that the gradient of the inclined straight line of the calibration curve is gentle, and the superior separating performance of the gel obtained by this invention is believed to be due to the low $\alpha$.

As discussed above studies have shown that when the types of monomers used for gel production are definite, there is a relationship between the weight percent (X) of the polyvinylbenzene unit in the total monomer units constituting the skeleton of the gel and $\alpha$ the slope of the gel calibration curve. $\alpha$ also becomes higher with higher X.

Figure 2:
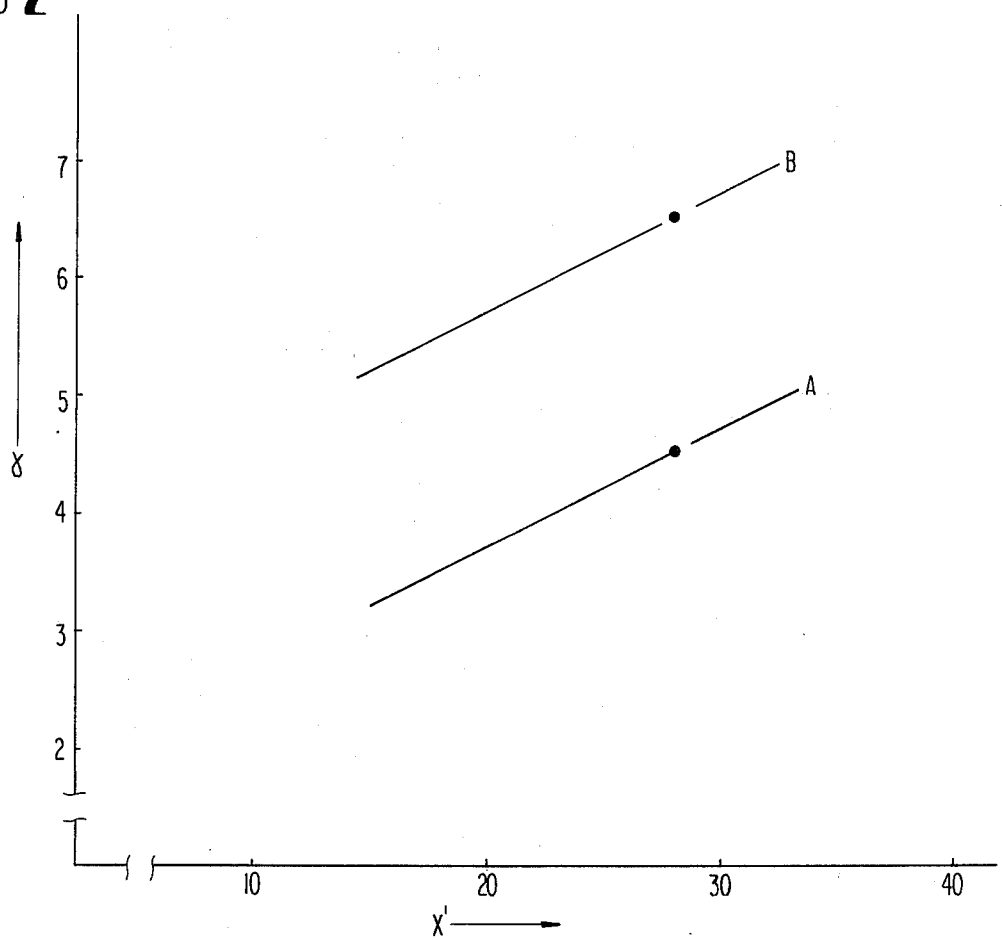
FIG. 2 is a graph of the gradient ($\alpha$) of the GPC gel calibration curve versus the divinylbenzene content ($X'$) of the gel, for a gel in accordance with the present invention (line A) obtained in Example 1 and a comparison gel (line B) obtained in Comparative Example 2.

As shown in FIG. 2, the gel (line A) obtained by the process of this invention has a lower $\alpha$ at the same X' than the gel (line B) obtained by polymerization in usual manner under conditions such that the half-life period of a polymerization initiator is about 10 hours. In other words, the gel obtained by this invention has improved separating performance over the gel obtained by the corresponding conventional process with the other properties being almost unchanged.

The granular crosslinked copolymer obtained by the process of this invention is particularly suitable as a packing for GPC, but can also be used as a packing for HLC based on the action of adsorption or distribution.

The following examples illustrate the present invention more specifically.

EXAMPLE 1

A one-liter flask was charged with 700 ml of water containing 4.2 g of polyvinyl alcohol dissolved in it, and a uniform mixture consisting of 36.4 g of styrene, 36.4 g of divinylbenzene (purity 56%), 69.8 g of toluene and 2 g of diisopropyl peroxydicarbonate was added. The flask was put into an ice water bath to sufficiently cool it. While maintaining the inside temperature of the flask at not more than 20° C., the polymerization mixture within the flask was stirred at high speed (about 20,000 rpm) by a laboratory disperser. The flask was then put into a water bath kept at 60° C., and while stirring (450 rpm) by a stirring rod equipped with boat-like blades to an extent such as to maintain the temperature of the inside of the flask uniform, the polymerization was performed at 60° C. for 6 hours, subsequently at 80° C. for 4 hours. The half-life period of diisopropyl peroxydicarbonate in toluene at 60° C. was 100 minutes. The resulting polymer particles were separated by filtration, washed thoroughly with water and acetone in this order, and dispersed in acetone to perform simple classification utilizing the differences in the sedimentation rate.

The volume average particle diameter of the resulting particles was measured in a 1% aqueous solution of sodium chloride using a Coulter Counter ZB type (a product of Coulter Electronics Co., U.S.A.), and was found to be 10.0 μm. The gel was dispersed in chloroform, and packed into a stainless steel column having an inside diameter of 7.5 mm and a length of 50 cm as a rising stream. The calibration curve was determined by the method described above. It was found consequently that $M_{lim}$ was 4,000, and α was 4.5. The gel was dried, and formed into KBr tablets, and its infrared absorption spectrum was measured. X as determined from the spectrum was 28%. Sr of the gel determined by the method described above was 1.36 ml/g. Furthermore, in a column packed with this gel, the number of theoretical plates (to be referred to as $N_B$) measured using benzene as a solute was 14,800. Using the packed column, a chloroform solution of styrene oligomers consisting mainly of a tetramer was analyzed by GPC. The chart obtained is shown in FIG. 3.

EXAMPLE 2

A gel was prepared in the same way as in Example 1 except that the stirring was performed by decreasing the speed of rotation of the disperser (about 12,000 rpm). The resulting gel had the following properties.
Volume average particle diameter: 15.0 μm
$M_{lim}$: 4,000

α=4.5

X=28%

Sr=1.35 ml $N_B$=10,000

EXAMPLE 3

A gel was prepared in the same way as in Example 1 except that a mixture consisting of 33.8 g of styrene, 39.0 g of divinylbenzene (purity 56%), 94.5 g of toluene and 2 g of 2,2'-azobis(2,4-dimethylvaleronitrile) was used instead of the polymerization mixture in Example 1, and the polymerization was performed at 80° C. for 10 hours. The half-life period of 2,2'-azobis(2,4-dimethylvaleronitrile) in toluene at 80° C. was 15 minutes.

The resulting gel had a volume average particle diameter of 9.0 μm, an Sr of 1.95 ml/g, and an X of 32%. From the calibration curve determined by using a column packed with this gel, α was 4.6, $M_{lim}$ was 11,000, and $N_B$ was 12,000.

Figure 4:
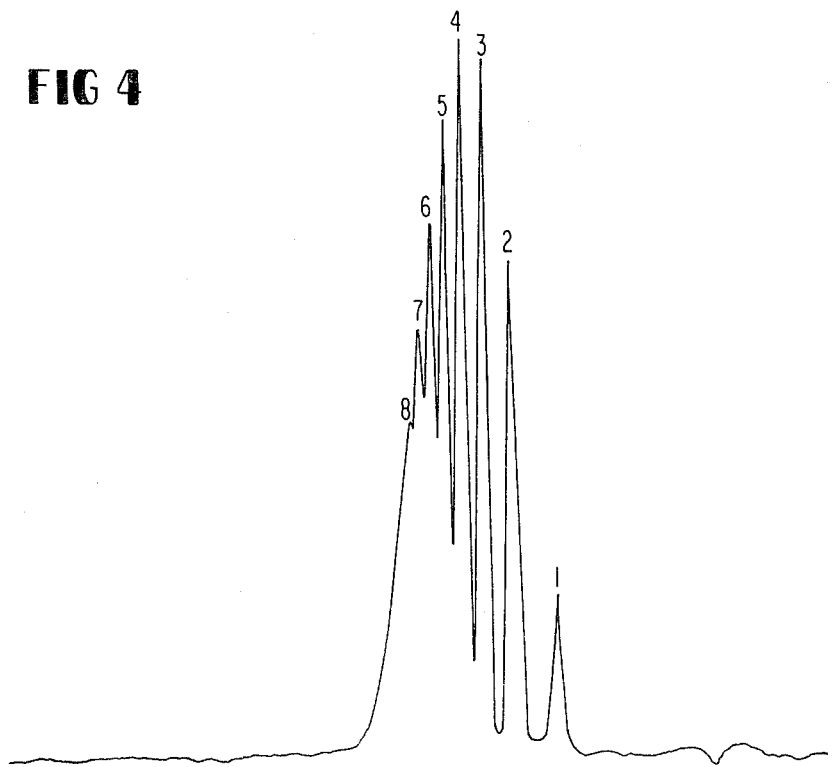

Using this packed column, styrene oligomers containing a tetramer as a major ingredient were analyzed in the same way as in Example 1. A chart (FIG. 4) showing the separation of mono- to octamers was obtained.

EXAMPLE 4

A gel was prepared in the same way as in Example 1 except that a mixture consisting of 36.4 g of styrene, 36.4 g of divinylbenzene (purity 56%), 69.8 g of toluene and 2 g of 2,2'-azobis(2,4-dimethylvaleronitrile) was used instead of the polymerization mixture in Example 1, and the polymerization was performed at 80° C. for 10 hours.

The resulting gel had a volume average particle diameter of 8.2 μm, an Sr of 1.28 ml/g, and an X of 28%. From the calibration curve determined by using a column packed with this gel, α was 4.3, $M_{lim}$ was 3,000 and $N_B$ was 15,600.

Figure 5:
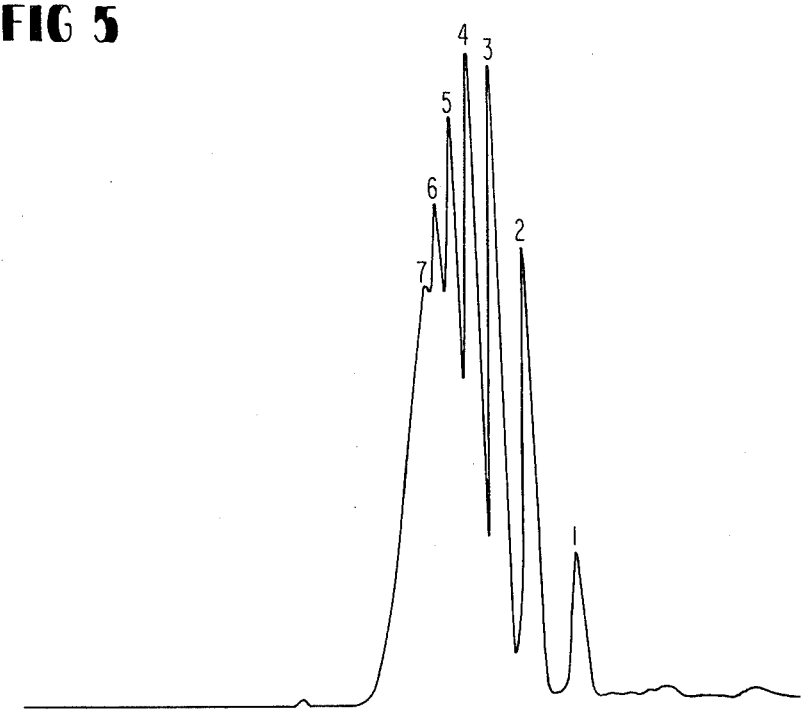

Using this packed column, styrene oligomers containing a tetramer as a major component were analyzed. A chart (FIG. 5) was obtained which shows separation of from mono- to heptamers.

EXAMPLE 5

A gel was prepared in the same way as in Example 3 except that the polymerization was performed at 70° C. for 10 hours. The half-life period of 2,2'-azobis(2,4-dimethylvaleronitrile) in toluene at 70° C. was 47 minutes.

The resulting gel had a volume average particle diameter of 8.6 μm, an Sr of 1.36 ml/g, and an X of 28%. From the calibration curve determined using a column packed with this gel as described above, α was 4.7, $M_{lim}$ was 3,800, and $N_B$ was 14,500.

Figure 6:
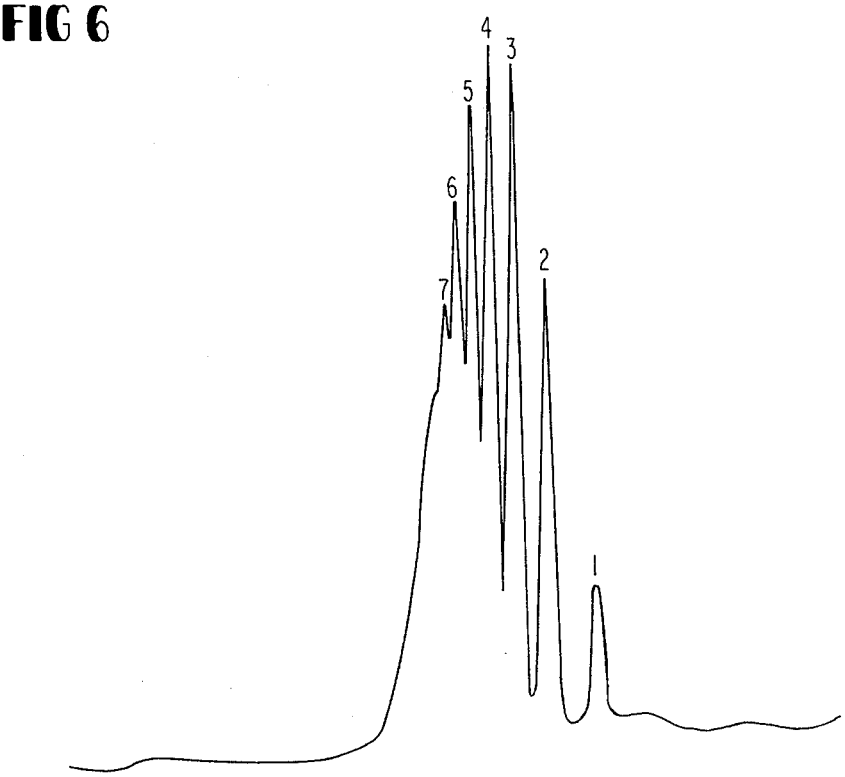

Using this packed column, styrene oligomers containing a tetramer as a major component were analyzed in the same way as in Example 1. A chart (FIG. 6) was obtained which shows the separation of from mono- to heptamers.

EXAMPLE 6

A gel was prepared in the same way as in Example 1 except that a mixture consisting of 41.6 g of styrene, 31.2 g of divinylbenzene (purity 56%), 69.8 g of toluene, 2 g of 2,2'-azobis(2,4-dimethylvaleronitrile) and 0.8 g of 2,2'-azobisisobutyronitrile was used instead of the polymerization mixture of Example 1, and the polymerization was performed at 80° C. for 10 hours.

The resulting gel had a volume average particle diameter of 8.3 μm, an Sr of 1.59 ml/g, and an X of 24%. From the calibration curve determined by using a column packed with this gel, α was 3.9, $M_{lim}$ was 2,300, and $N_B$ was 15,100.

Figure 7:
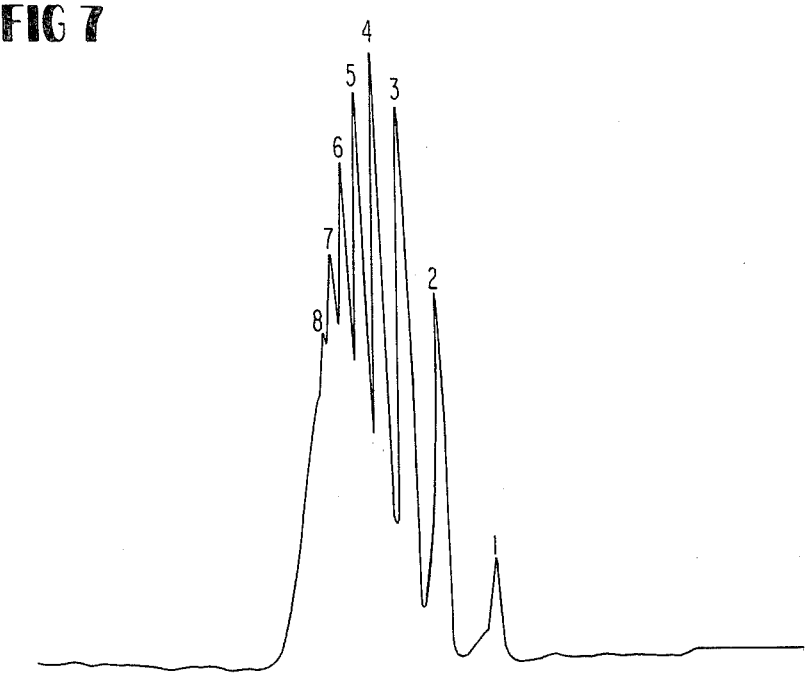

Styrene oligomers containing a tetramer as a major component were analyzed in the same way as in Example 1 using this packed column. A chart (FIG. 7) was obtained which shows separation of mono- to octamers.

COMPARATIVE EXAMPLE 1

The procedure of Example 1 was repeated except that 2,2'-azobisisobutyronitrile was used as the polymerization initiator. The half-life period of 2,2'-azobisisobutyronitrile in toluene at 60° C. was 17 hours.

Figure 8:
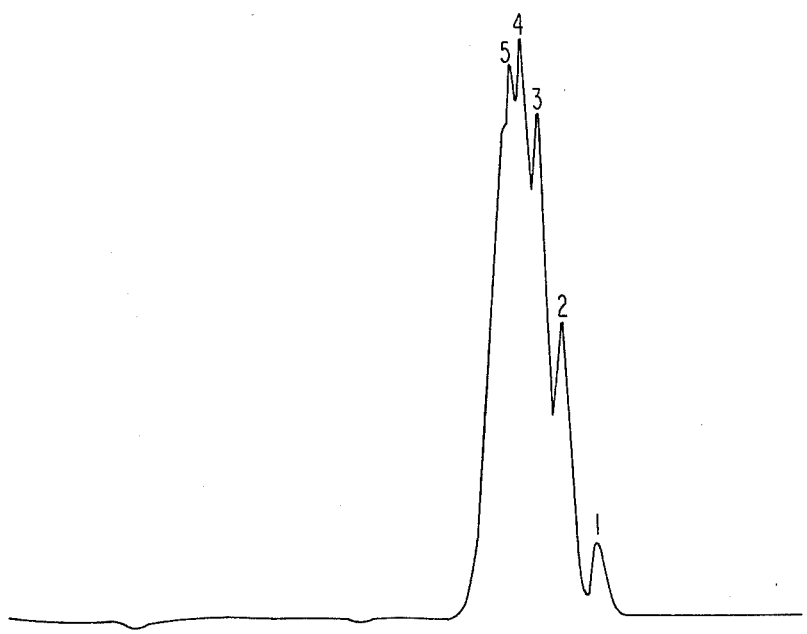
FIGS. 8 and 9 are chromatograms obtained using the gels in Comparative Examples 1 and 2.

The resulting gel had a volume average particle diameter of 9.1 μm, an Sr of 1.23 ml/g, and X of 28%. Using this gel, GPC analysis was performed in the same way as in Example 1. The results obtained were: $\alpha = 6.5$, $M_{lim} = 7,000$ and $N_B = 9,300$. The analysis chart of styrene oligomers was as shown in FIG. 8.

A comparison of the chart (FIG. 3) obtained in Example 1 with the chart (FIG. 8) obtained in Comparative Example 1 shows that while in Comparative Example 1, the gel permitted separation of only mono- to pentamers, whereas the gel of Example 1 permitted separation of mono- to heptamers, showing the very good separating performance of the gel of this invention.

COMPARATIVE EXAMPLE 2

In this example, the polymerization initiator and the polymerization temperature disclosed in U.S. Pat. Nos. 3,326,875 or 3,322,695 were used.

Specifically, a gel was prepared in the same way as in Example 1 except that benzoyl peroxide was used as the polymerization initiator, and the polymerization was performed for 48 hours at 75° C., and for another 48 hours at 120° C. The half-life period of benzoyl peroxide at 75° C. was about 10 hours.

Figure 9:
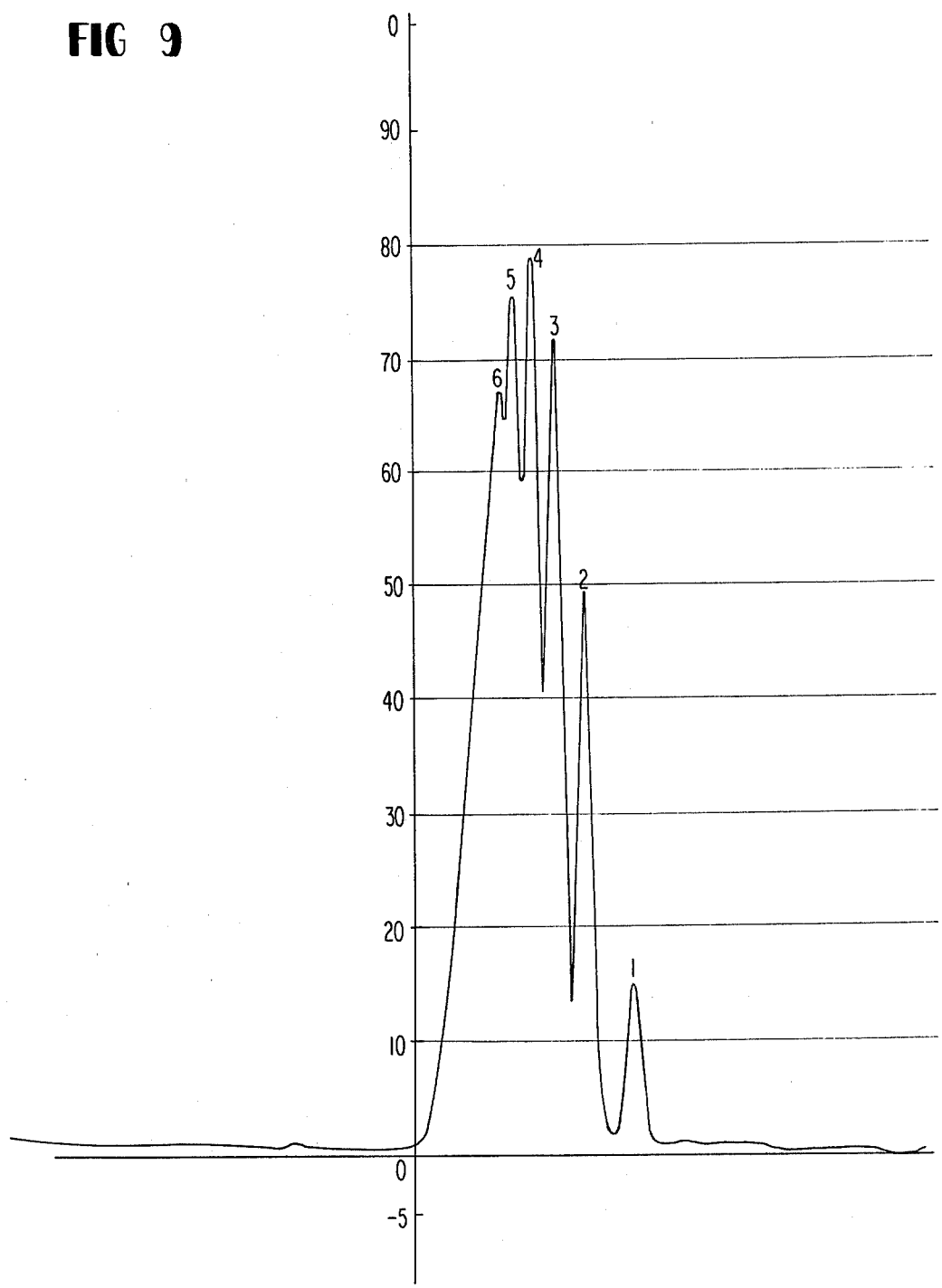

The resulting gel had a volume average particle diameter of 9.9 μm, an Sr of 1.31 ml/g, and an X of 28%. Using this gel, GPC analysis was performed in the same way as in Example 1. The results were: $\alpha = 5.6$, $M_{lim} = 6,600$, and $N_B = 15,500$. The analytical chart of styrene oligomers containing a tetramer as a major component was as shown in FIG. 9. A comparison of this chart with the chart (FIG. 3) obtained in Example 1 and the charts obtained in other Examples shows that while the gel of Comparative Example 2 permitted separation of mono- to hexamers, the gels in the other Examples within the scope of this invention permitted separation of mono- to hepta- or octamers. This shows the very superior separating ability of the gels of this invention.

While the invention has been described in detail and with reference to specific embodiments thereof, it will be apparent to one skilled in the art that various changes and modifications can be made therein without departing from the spirit and scope thereof.

What is claimed is:

1. A packing for high speed liquid chromatography prepared by the process which comprises suspending in water a mixture consisting of 65 to 90 parts by weight of at least one monovinylbenzene, 35 to 10 parts by weight of at least one polyvinylbenzene, the total amount of the monovinylbenzene and polyvinylbenzene being 100 parts by weight, and 30 to 200 parts by weight of a solvent capable of dissolving polystyrene, and free radical-polymerizing the monovinylbenzene and the polyvinylbenzene in suspension, said polymerizaton being carried out in the presence of 0.1 to 5.0 parts by weight of at least one free radical polymerization initiator having a half-life period of about 2 to 60 minutes at 70° C., and in such a manner that at least until the polymerization conversion reaches 50%, the polymerization is effected at a temperature at which the half-life period of the polymerization initiator is in the range of about 5 to 120 minutes to thereby provide a microporous, granular cross-linked monovinylbenzene-polyvinylbenzene copolymer having a volume average particle diameter of about 2 to 50 micrometers, an exclusive molecular weight for polystyrene of about 500 to 20,000, and the weight percent (X) of polyvinylbenzene units based on the total monomeric units in the copolymer and the gradient ($\alpha$) of the calibration curve of the polystyrene are defined by the region bounded by and including the following three lines in rectangular coordinates ($\alpha$, X):

$$\alpha = \frac{2}{15} X + \frac{4}{3}$$

$\alpha = 2.5$ $X = 35$.

2. The packing of claim 1 wherein the polymerization initiator is 2,2'-azobis(2,4-dimethylvaleronitrile) or diisopropyl peroxydicarbonate.

3. The packing of claim 1 wherein the polymerization initiator is 2,2'-azobis(2,4-dimethylvaleronitrile) and at least until the polymerization conversion reaches 50%, the polymerization is carried out at a temperature of about 65° to 85° C.

4. The packing of claim 1 wherein the polymerization initiator is diisopropyl peroxydicarbonate and at least until the polymerization conversation reaches 50%, the polymerization is carried out at a temperature of about 60° to 80° C.

5. The packing of claim 1 wherein said at least one monovinylbenzene is styrene and said at least one polyvinylbenzene is divinylbenzene.

6. The packing of claim 1 wherein said polymerization initiator is selected from the group consisting of 2,2'-azobis(4-methoxy-2,4-dimethylvaleronitrile), 2,2'-azobis(2,4-dimethylvaleronitrile), isobutyryl peroxide, diisopropyl peroxydicarbonate, and di-2-ethylhexyl peroxydicarbonate.

7. The packing of claim 1 wherein the weight % (X) and the gradient ($\alpha$) are defined by the region bounded by and including the following three lines in rectangular coordinates ($\alpha$, X):

$$\alpha = \frac{2}{15} X + \frac{4}{3}$$

$\alpha = 3$ $X = 27$.

8. The packing of claim 1, wherein the weight % (X) and the gradient ($\alpha$) are defined by the region bounded by and including the following four lines in rectangular coordinates ($\alpha$, X):

$$\alpha = \frac{2}{15} X + \frac{16}{15}$$

$\alpha = 4.4$ $X = 27$ $X = 35$.

9. The packing of claim 1, wherein said copolymer has a volume average particle diameter of about 5 to 30 μm.

10. The packing of claim 1, wherein said exclusive molecular weight is from about 1,500 to 12,000.

11. The packing of claim 1 having a toluene regain of about 0.5 to 2.5 m/g.

12. The packing of claim 1, wherein said copolymer is a styrene-divinylbenzene-based copolymer.

13. The packing of claim 1 wherein said mixture suspended in water consists of about 65 to 80 parts by weight of at least one monovinylbenzene, about 35 to 20 parts by weight of at least one polyvinylbenzene, the total amount of the monovinylbenzene and the polyvinylbenzene being 100 parts by weight, and 80 to 150 parts by weight of the solvent capable of dissolving polystyrene.

14. The packing of claim 1 wherein the solvent capable of dissolving polystyrene is toluene.

15. The packing of claim 1 wherein said polymerization initiator having a half-life of 2 to 60 minutes at 70° C. makes up at least 60% by weight of the total polymerization initiator.

* * * * *